United States Patent
Otsuka (10) Patent No.: US 7,224,844 B2
(45) Date of Patent: May 29, 2007

(54) ENTROPY CODING APPARATUS

(75) Inventor: Katsumi Otsuka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1014 days.

(21) Appl. No.: 10/410,120

(22) Filed: Apr. 9, 2003

(65) Prior Publication Data
US 2003/0219164 A1  Nov. 27, 2003

(30) Foreign Application Priority Data
Apr. 9, 2002  (JP)  .............................. 2002-106503
Apr. 7, 2003  (JP)  .............................. 2003-102804

(51) Int. Cl.
*G06K 9/72*  (2006.01)

(52) U.S. Cl. .................... 382/239; 341/67; 382/234; 382/244; 358/426.02; 358/426.06; 358/426.07; 358/426.13

(58) Field of Classification Search ................. 341/67; 382/234, 238, 239, 244–253; 358/426.02, 358/426.06, 246.07, 426.13
See application file for complete search history.

(56) References Cited

U.S. PATENT DOCUMENTS

| | | | | |
|---|---|---|---|---|
| 5,138,315 A | * | 8/1992 | Le Queau et al. ............ | 341/67 |
| 5,263,100 A | * | 11/1993 | Kim et al. ................... | 382/166 |
| 5,379,070 A | * | 1/1995 | Retter et al. ............. | 375/240.2 |
| 5,475,502 A | * | 12/1995 | Lee et al. .................... | 382/239 |
| 5,568,278 A | * | 10/1996 | Nakano et al. ............. | 382/248 |
| 5,751,232 A | * | 5/1998 | Inoue et al. .................. | 341/63 |
| 2002/0090142 A1 | | 7/2002 | Igarashi et al. ............. | 382/246 |
| 2002/0122599 A1 | | 9/2002 | Igarashi et al. ............. | 382/239 |
| 2002/0154042 A1 | | 10/2002 | Igarashi et al. ............... | 341/67 |
| 2002/0164080 A1 | | 11/2002 | Igarashi et al. ............. | 382/233 |
| 2003/0058143 A1 | | 3/2003 | Chiba et al. .................. | 341/67 |

* cited by examiner

*Primary Examiner*—Bravesh M Mehta
*Assistant Examiner*—Christopher Lavin
(74) *Attorney, Agent, or Firm*—Fitzpatrick, Cella, Harper & Scinto (57) ABSTRACT

For the entropy coding of image data after subjected to orthogonal transforation and quantization, a plurality of entropy coding units are provided in parallel. The plurality of entropy coding units can be operated efficiently and the entropy coding can be executed at high speed. In order to realize these operations, for example, an entropy coding apparatus has: an orthogonal transformation unit for performing an orthogonal transformation of image data; a quantization unit for quantizing coefficients obtained by the orthogonal transformation; N entropy coding units for entropy-coding the quantized coefficients output from the quantization unit; a distribution unit for selecting one of the N entropy coding units for each quantized coefficient and supplying the quantized coefficient to the selected entropy coding unit; and a prediction unit for monitoring a coding state of each of the N entropy coding units and predicting an optimum one of the N entropy coding units for a succeeding quantized coefficient in accordance with monitor results.

12 Claims, 10 Drawing Sheets

| DISTRIBUTION UNIT | | RL/CATEGORY ENCODING UNIT 1 OR 2 | | VARIABLE LENGTH CODING UNIT 1 OR 2 | | BUFFER UNIT 1 OR 2 | | CONNECTION UNIT | |
|---|---|---|---|---|---|---|---|---|---|
| INPUT I/F | OUTPUT I/F | INPUT I/F | OUTPUT I/F | INPUT I/F | OUTPUT I/F | INPUT I/F | OUTPUT I/F | INPUT I/F | OUTPUT I/F |
| 4 ORTHOGONAL TRANSFORMATION COEFFICIENT | 4 ORTHOGONAL TRANSFORMATION COEFFICIENT | 4 ORTHOGONAL TRANSFORMATION COEFFICIENT | 2 SYMBOL | 2 SYMBOL | 1–32 BIT | 1–32 BIT | 1–32 BIT | 1–32 BIT | 4 BYTE |

ENTROPY CODING APPARATUS

BACKGROUND OF THE INVENTION

1. Field of the Invention

The present invention relates to an entropy coding apparatus for efficiently entropy-coding still images or moving images.

2. Related Background Art

As conventional compression coding technology for still images and moving images, an entropy coding technology utilizing runlength/category coding technology and variable length coding are well known.

As these technologies, a Joint Photographic Experts Group (JPEG) coding system and a Moving Picture Experts Group (MPEG) coding system which are international standards are well known.

Both these coding systems utilize an orthogonal transformation coding system and executes a quantization process for orthogonal transformation coefficients generated after the orthogonal transformation. A stream of quantized orthogonal transformation coefficients (quantized coefficients) is arranged in a zigzag scan order and subjected to RrunLength (RL)/category encoding to obtain symbol data.

Strictly speaking, although runlength/category encoding is slightly different between JPEG and MPEG coding systems, it is analogous in that a quantized coefficient having a value other than 0 and the number of consecutive quantized coefficients having a value of 0 and preceding the first mentioned quantized value are used as a group to be subjected to runlength coding.

Figure 2:
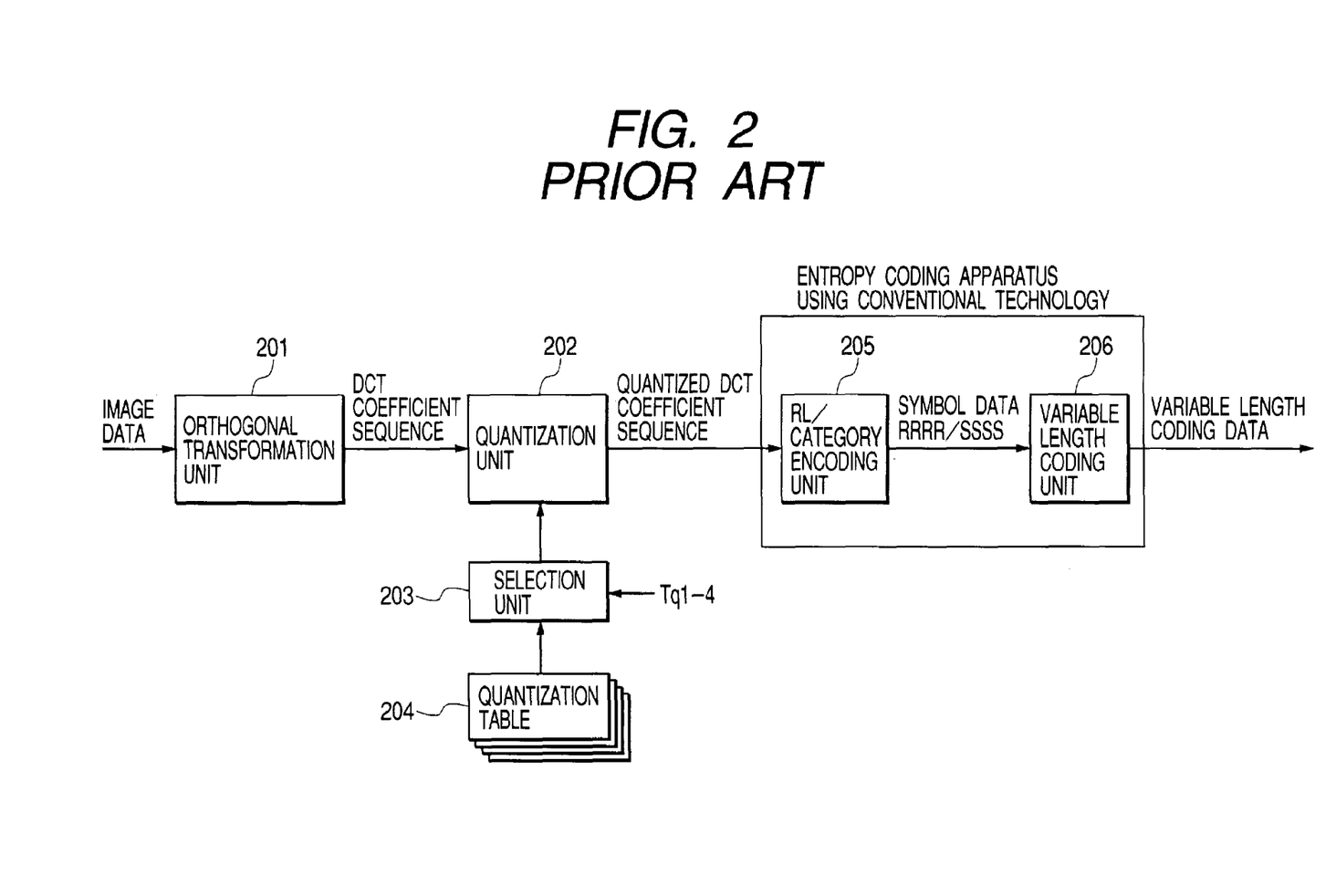
FIG. 2 is a diagram showing an entropy coding apparatus using conventional technology.

FIG. 2 shows an entropy coding apparatus using conventional technology.

The entropy coding apparatus shown in FIG. 2 receives (inputs) a stream of quantized orthogonal transformation coefficients and outputs variable length coding data. This entropy coding apparatus is constituted of a runlength/category encoding unit 205 and a variable length encoding unit 206.

For example, in realizing the JPEG coding system by using this entropy coding apparatus, the runlength/category encoding unit 205 generates runlength (symbol RRRR) and category (symbol SSSS) which are symbol data, and addition bits.

The variable length encoding unit 206 variable-length encodes symbol data by referring to a Huffman table to generate variable length encoding data.

In FIG. 2 it is assumed that a stream of quantized orthogonal transformation coefficients input to the entropy coding apparatus becomes a JPEG coding data stream at the succeeding stage.

The size of image data capable of being processed by various image systems is recently becoming very large because of improvement on the data transfer capacity of a communication network and high density of storage devices. Processing image data of high quality is therefore made in many cases.

A coding apparatus for compressing such image data is therefore required to provide compression coding at a high bit rate.

The number of pixels of an image read sensor is increasing in the field of digital cameras, digital video, copying machines, printers and the like to obtain image data.

The coding apparatus is therefore required to operate at a high throughput. A function is also required which makes the size of variable length coding data generated through compression as small as possible.

An entropy coding apparatus according to conventional technology cannot provide a sufficient throughput in a system requiring a high bit rate process and a system mounted with a sensor for a large number of pixels.

If the capacity of a storage device for storing variable length coding data generated by the coding apparatus is small so that the upper limit size of variable length coding data is determined in advance and if the variable length coding data initially generated by the apparatus exceeds the upper limit size, it is necessary to execute again the compression process by using another quantization table (a quantization table having large values as a whole).

In such a case, the time taken to compress image data becomes long.

SUMMARY OF THE INVENTION

The present invention has been made to solve the above-described problems. It is an object of the present invention to provide an entropy coding apparatus in which for the entropy coding of image data after subjected to orthogonal transforation and quantization, a plurality of entropy coding units are provided in parallel, a plurality of entropy coding units can be operated efficiently and the entropy coding can be executed at high speed.

It is another object of the invention to provide an entropy coding apparatus in which in the case that high throughput is required to execute coding, in the case that the target amount of variable length coding data to be finally output is set or in other cases, a proper compression can be executed.

In order to achieve the above objects, a preferred embodiment of the invention provides an entropy coding apparatus comprising: an orthogonal transformation unit for performing an orthogonal transformation of image data; a quantization unit for quantizing coefficients obtained by the orthogonal transformation; N (natural number of 2 or larger) entropy coding units for entropy-coding the quantized coefficients output from the quantization unit; a distribution unit for selecting one of the N entropy coding units for each quantized coefficient and supplying the quantized coefficient to the selected entropy coding unit; and a prediction unit for monitoring a coding state of each of the N entropy coding units and predicting an optimum one of the N entropy coding units for a succeeding quantized coefficient as a supplying destination in accordance with monitor results.

Other features and advantages of the present invention will become apparent from the following description taken in conjunction with the accompanying drawings.

DESCRIPTION OF THE PREFERRED EMBODIMENTS

Preferred embodiments of the invention will be described in detail.

Figure 1:
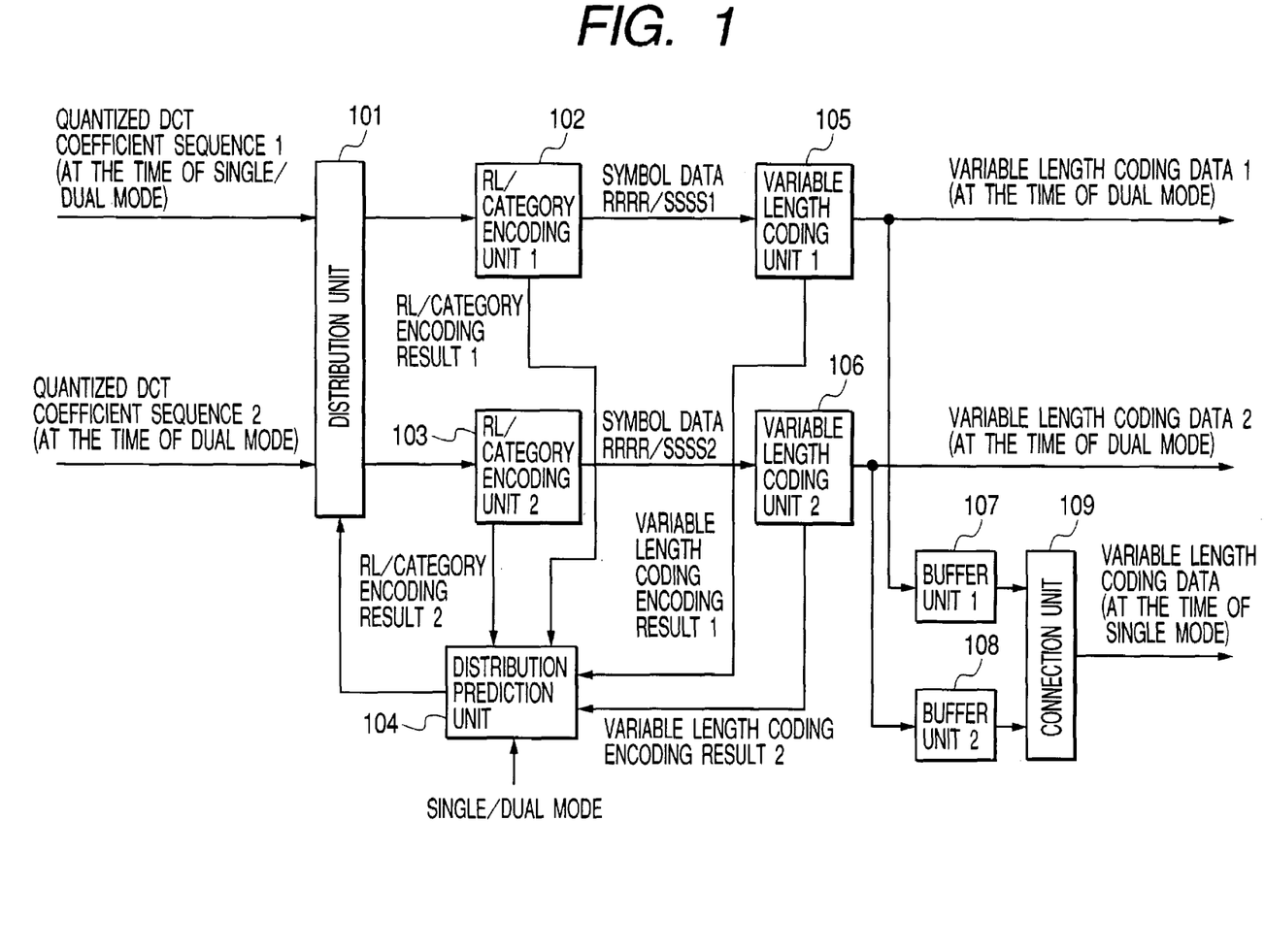
FIG. 1 is a diagram showing an entropy coding apparatus (having two entropy coding units) according to an embodiment of the invention.

FIG. 1 shows the fundamental structure of an entropy coding apparatus applicable to the invention.

Referring to FIG. 1, the entropy coding apparatus has a distribution unit 101, a runlength(RL)/category encoding unit (1) 102, a runlength(RL)/category encoding unit (2) 103, a distribution prediction unit 104, a variable length coding unit (1) 105, a variable length coding unit (2) 106, a buffer unit (1) 107, a buffer unit (2) 108, and a connection unit 109.

The RL/category encoding units (1) and (2) and variable length coding units (1) and (2) have similar functions to those of the units having identical names shown in FIG. 2. The distribution unit 101 distributes quantized DCT coefficients (quantized coefficients) to a plurality (two in this embodiment) of RL/category encoding units.

The distribution prediction unit 104 monitors the coding states of the RL/category encoding units (1) and (2) and variable length coding units (1) and (2), and in accordance with the monitored results, predicts a destination (in this embodiment, one of the RL/category encoding units (1) and (2)) to which the quantized coefficients are supplied next from the distribution unit 101.

The buffer unit (1) 107 temporarily stores variable length encoding data generated by the variable length coding unit (1), and the buffer unit (2) 108 temporarily stores variable length encoding data generated by the variable length coding unit (2).

The connection unit 109 connects the variable length coding data stored in the buffer units (1) 107 and (2) 108 to obtain one set of coding data.

With this connection process, it is possible to obtain an encoding data stream same as that obtained through entropy coding by one RL/category encoding unit and one variable length coding unit, even if the RL/category encoding units (1) and (2) and variable length coding units (1) and (2) operate in parallel.

The embodiment apparatus has a plurality of coding modes; one being a single mode and the other being a dual mode.

In the single mode, one set of encoding data is generated by using a single compression parameter. In the single mode, quantized coefficients quantized by the same quantization table are input to the distribution unit 101.

The distribution unit 101 distributes quantized coefficients to the RL/category encoding units (1) and (2). Symbol data output from each RL/category unit is variable-length encoded by the corresponding variable length coding unit (1) or (2). An output from each variable length coding unit is stored in the corresponding buffer unit (1) or (2). The stored data is connected by the connection unit 109.

In the dual mode, a plurality set of encoding data streams are generated at the same time by using a plurality of compression parameters.

In the dual mode, quantized coefficients quantized by two kinds of quantization tables are input to the distribution unit 101.

The distribution unit 101 adaptatively distributes quantized coefficients to the RL/category encoding units (1) and (2). Symbol data output from each RL/category unit is variable-length encoded by the corresponding variable length coding unit (1) or (2). An output from each variable length coding unit is output to the succeeding stage as different sets of encoding data.

The entropy coding apparatus can selectively execute one of the two modes described above, which is one of the features of the invention.

The entropy coding apparatus shown in FIG. 1 has the distinctive feature that a plurality (N) of RL/category encoding units and a plurality N of variable length coding units are used. For the simplicity of description, N=2 is used illustratively.

Figure 8:
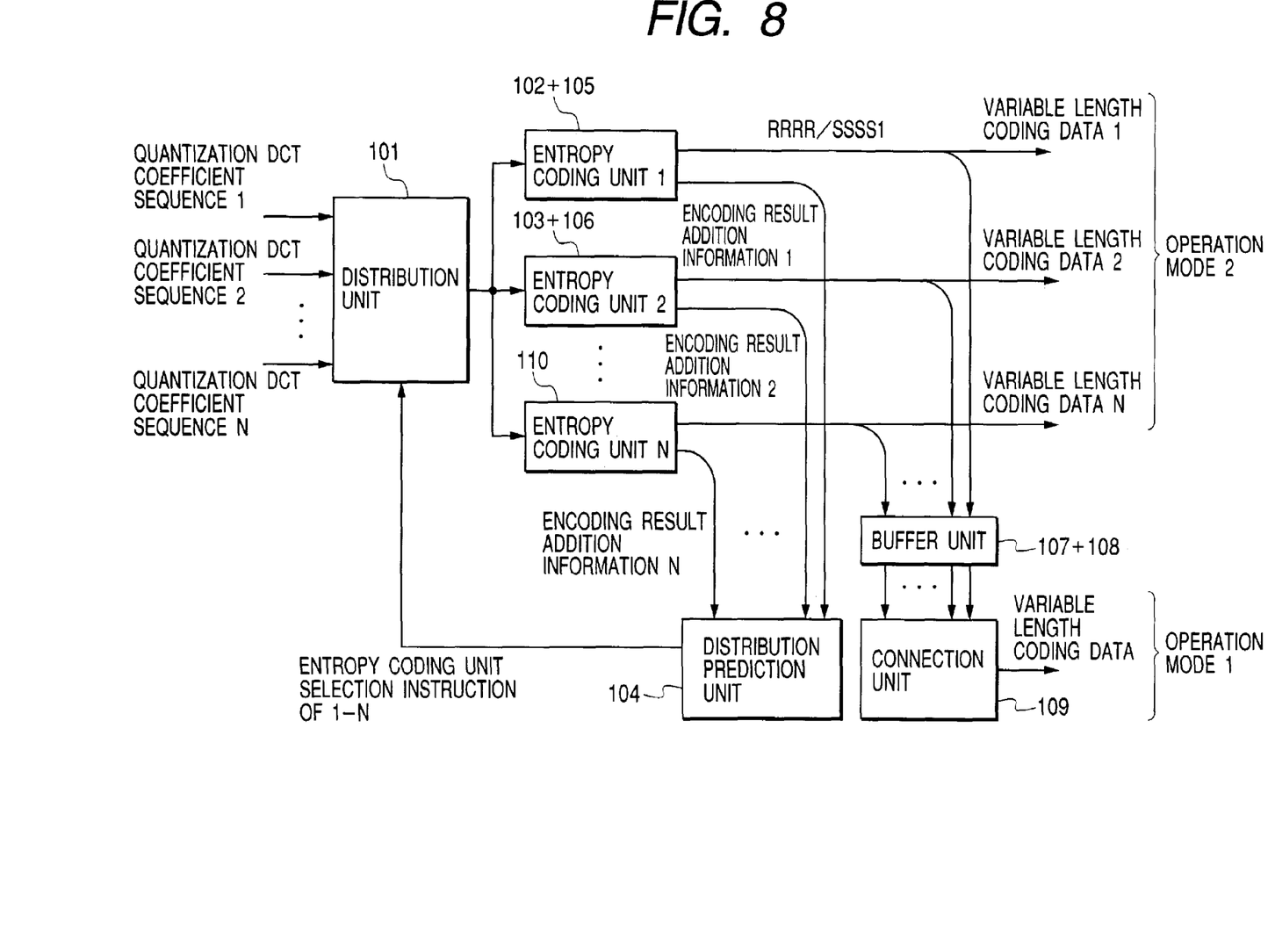
FIG. 8 is a diagram showing an entropy coding apparatus (having N entropy coding units) according to an embodiment of the invention.

FIG. 8 shows an entropy coding apparatus having N=3 or larger. The description thereof is omitted because each processing unit represented by similar reference numerals has a similar function to that shown in FIG. 1.

(Single Mode)

Figure 3:
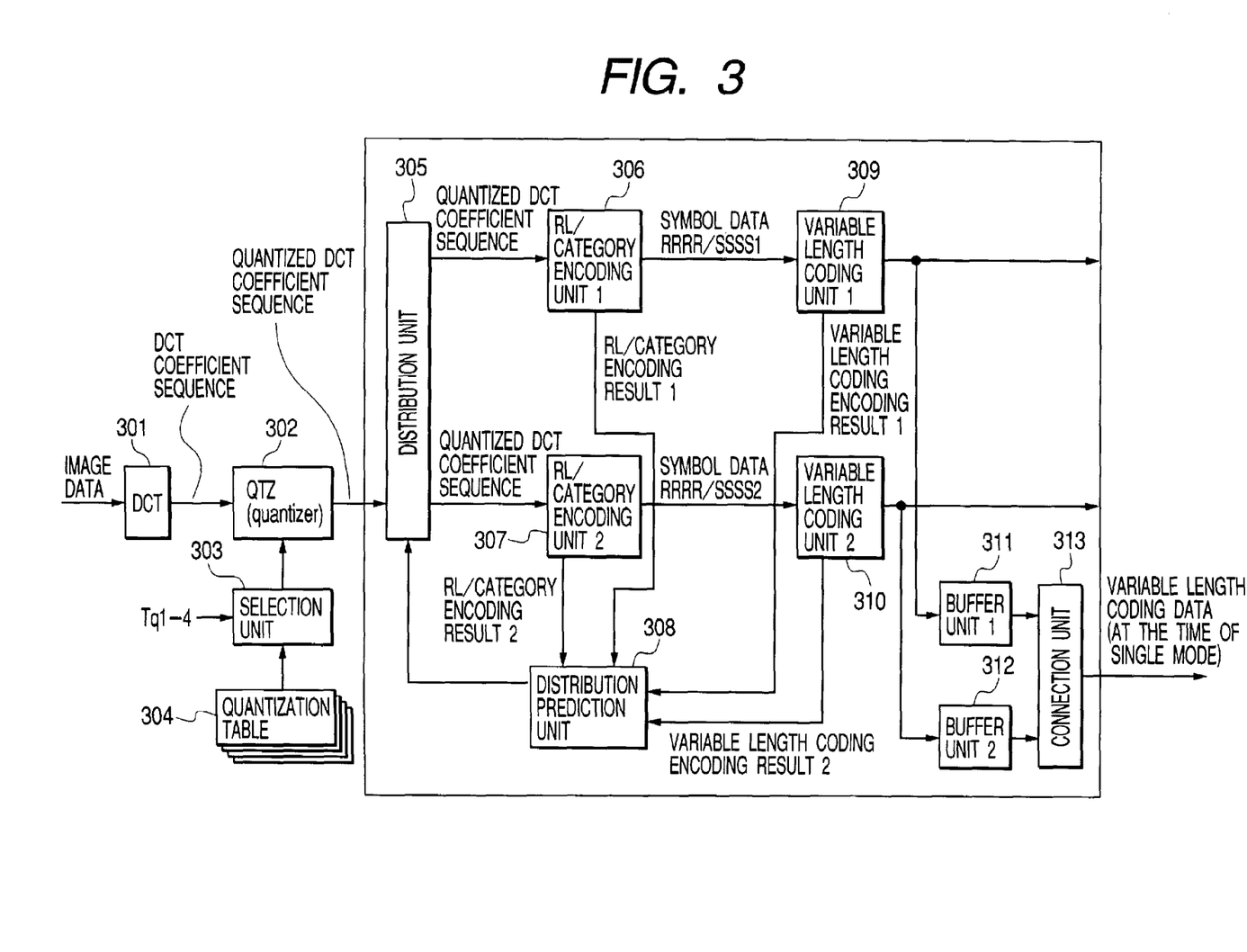
FIG. 3 is a diagram showing an entropy coding apparatus and illustrating the operation in a single mode.

FIG. 3 shows a JPEG coding system which performs an entropy coding process in the single mode necessary for a high throughput.

This entropy coding apparatus generates at high speed one set of variable length coding data representative of one image. In this mode, therefore, quantization of image data in the same area is performed by using only the same quantization table.

The distinctive feature of this coding mode also resides in that a plurality (N) of RL/category encoding units and a plurality N of variable length coding units are used. For the simplicity of description, N=2 is used illustratively.

Although this mode will be described with reference not to FIG. 1 but to FIG. 3, the contents of FIGS. 1 and 3 are substantially the same. Each processing unit shown in FIG. 3 is the same as that shown in FIG. 1 unless otherwise specifically notified.

In this coding mode, input image data is subjected to orthogonal transformation and quantization well known in JPEG at a DCT unit 301 and a quantizer (QTZ) 302, to thereby generate a stream of quantized orthogonal transformation coefficients (quantized coefficients).

Each quantization table 304 stores 64 quantized values corresponding to respective elements of an 8×8 DCT block. The quantization table 304 can be formed by using a known storage device such as a Static Random Access Memory (SRAM) and a Read Only Memory (ROM).

A selection unit 303 selects one of a plurality of quantization tables to use it along with the 8×8 DCT block to be presently processed. This selection is performed in accordance with Tq1 to Tq4 parameters (selection parameters for quantization tables) which are one type of JPEG compression parameters.

A rate at which a stream of quantized orthogonal transformation coefficients is input to the entropy coding apparatus (RL/category encoding unit) changes with how conventional technology is incorporated. In this embodiment, in order to make it easy to understand the description, it is assumed that four quantized orthogonal transformation coefficients per one cycle are input.

The invention is not dependent upon the rate of an input stream of quantized orthogonal transformation coefficients, but is applicable to various rates of an input stream of quantized orthogonal transformation coefficients.

Figure 7:
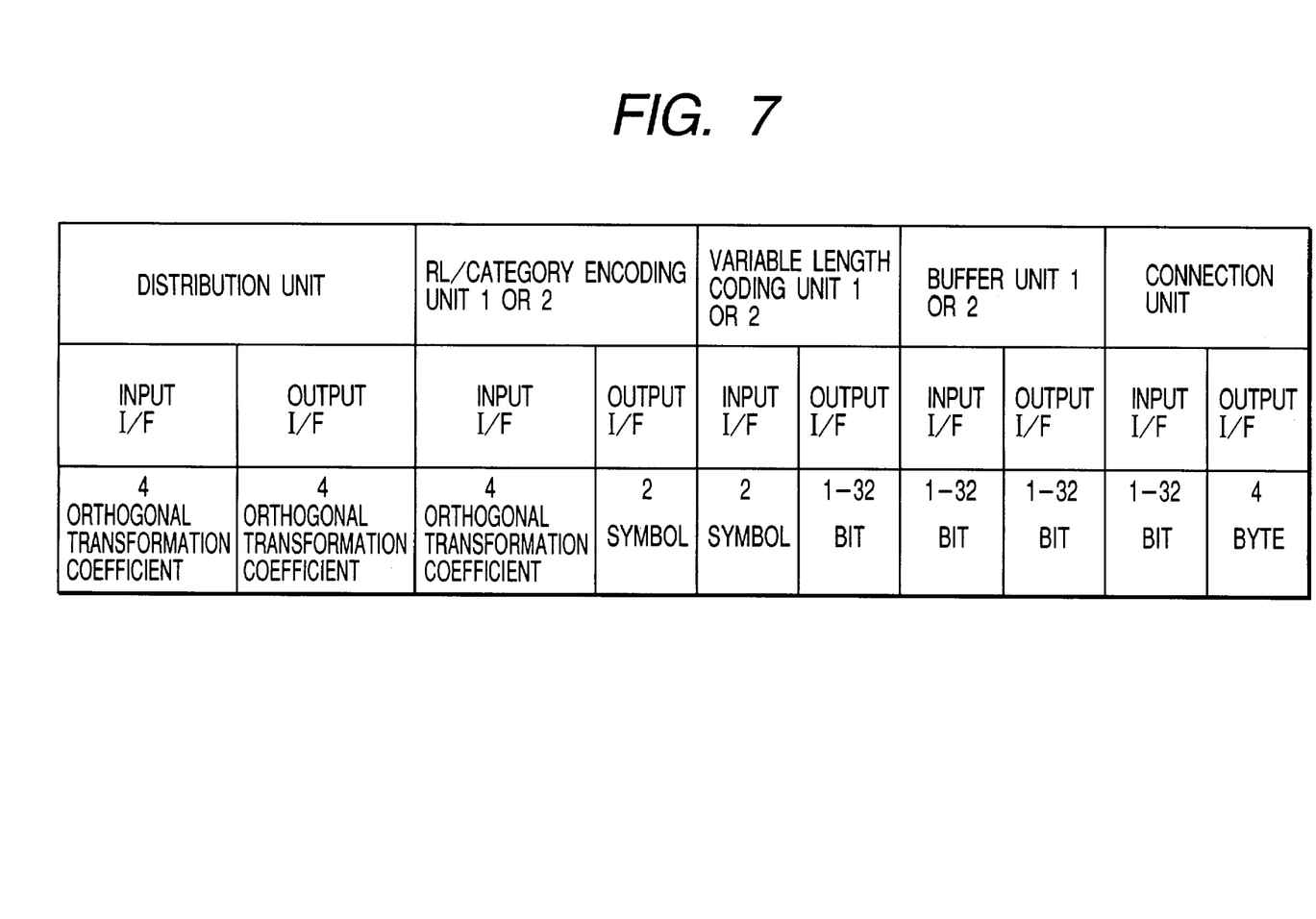
FIG. 7 is a diagram showing the data amount in an input/output interface of each processing unit of the entropy coding apparatus.

FIG. 7 shows the data amount in an input/output interface in each cycle to be processed by each processing unit of the entropy coding apparatus.

By referring to FIGS. 3 and 7, the description will be made on the relation between a throughput as one index of a coding performance of the entropy coding apparatus and data to be generated during coding.

A throughput of the distribution unit 305 does not depend upon the values of quantized transformation coefficients because the distribution unit does not operate in correspondence with the orthogonal transformation coefficient values, and outputs orthogonal transformation coefficients quantized at the rate (four coefficients/cycle) same as the input rate.

The RL/category encoding units (1) 306 and (2) 307 transform the orthogonal transformation coefficient stream quantized in a manner described above into corresponding symbol data RRRR/SSSS (1) and RRRR/SSSS (2).

It is assumed in this embodiment that the throughputs of the RL/category encoding units (1) 306 and (2) 307 are two symbols/cycle. Namely, if there are two or less significant coefficients among four orthogonal transformation coefficients input per each cycle, the RL/category encoding can be performed without any wait. If there are three or more significant coefficients, it is necessary to make the preceding distribution unit 305 suspend an input. The throughputs of the RL/category encoding units (1) 306 and (2) 307 are therefore dependent upon the number of significant coefficients.

The RL/category encoding units (1) 306 and (2) 307 supply the symbol data RRRR/SSSS (1) and RRRR/SSSS (2) to the variable length coding units (1) 309 and (2) 310 at the rate of two symbols/cycle.

It is assumed in this embodiment that the variable length coding units (1) 309 and (2) 310 transform the two sets of symbol data into variable length code words at the same time in each cycle. Considering the throughputs of the variable length coding units (1) 309 and 92) 310, since the output rate of the variable length coding units (1) 309 and (2) 310 is four bytes/cycle, these units can perform the variable length coding without any wait if the length of two variable length code words transformed from the two sets of symbol data is four bytes or less. If the length of two variable length code words is more than four bytes, it is necessary to make the preceding RL/category encoding units (1) 306 and (2) 307 suspend an input. The throughputs of the variable length coding units (1) 309 and (2) 310 are dependent upon the variable length coding words uniquely determined by the type of two sets of symbol data.

Similar to the distribution unit 305, since the buffer units (1) 311 and (2) 312 and the connection unit 313 do not perform an internal calculation operation, they output data at the same rate as the input rate. Namely, the throughput is four bytes/cycle.

It can be understood from the above-described features of the throughputs of the entropy coding apparatus that the number of symbol data sets and the lengths of the variable length code words are effective for the information to be used by the distribution prediction unit 308 to determine one of the two entropy coding units in parallel constituted of the RL/category encoding units (1) 306 and (2) 307 and variable length coding units (1) 309 and (2) 310.

With the operation described above taken into consideration, the embodiment is provided with signal lines shown in FIG. 3.

In FIG. 3, signal lines "RL/category encoding results" (1) and (2) are used for sending the numbers of symbol data sets, and signal lines "variable length coding results" (1) and (2) are used for sending the lengths of the variable length code words.

In accordance with the supplied results, the distribution prediction unit 308 determines to which one of the RL/category encoding units (1) 306 and (2) 307 the stream of quantized orthogonal transformation coefficients (quantized coefficients) input from the distribution unit 305 is supplied.

A timing when the distribution unit 305 changes a distribution and supply destination of the input stream of quantized orthogonal transformation coefficients (quantized coefficients) to the succeeding stage (RL/category encoding unit) is in this embodiment a Minimum Coded Unit (MCU) for coding in the JPEG coding system. In order to make it easy to understand the description, in this embodiment, it is assumed that the number of components of MCU is 1 and the component is constituted of one block. Namely, the timing when the distribution and supply destination is switched is every 8×8 pixels.

Figure 4:
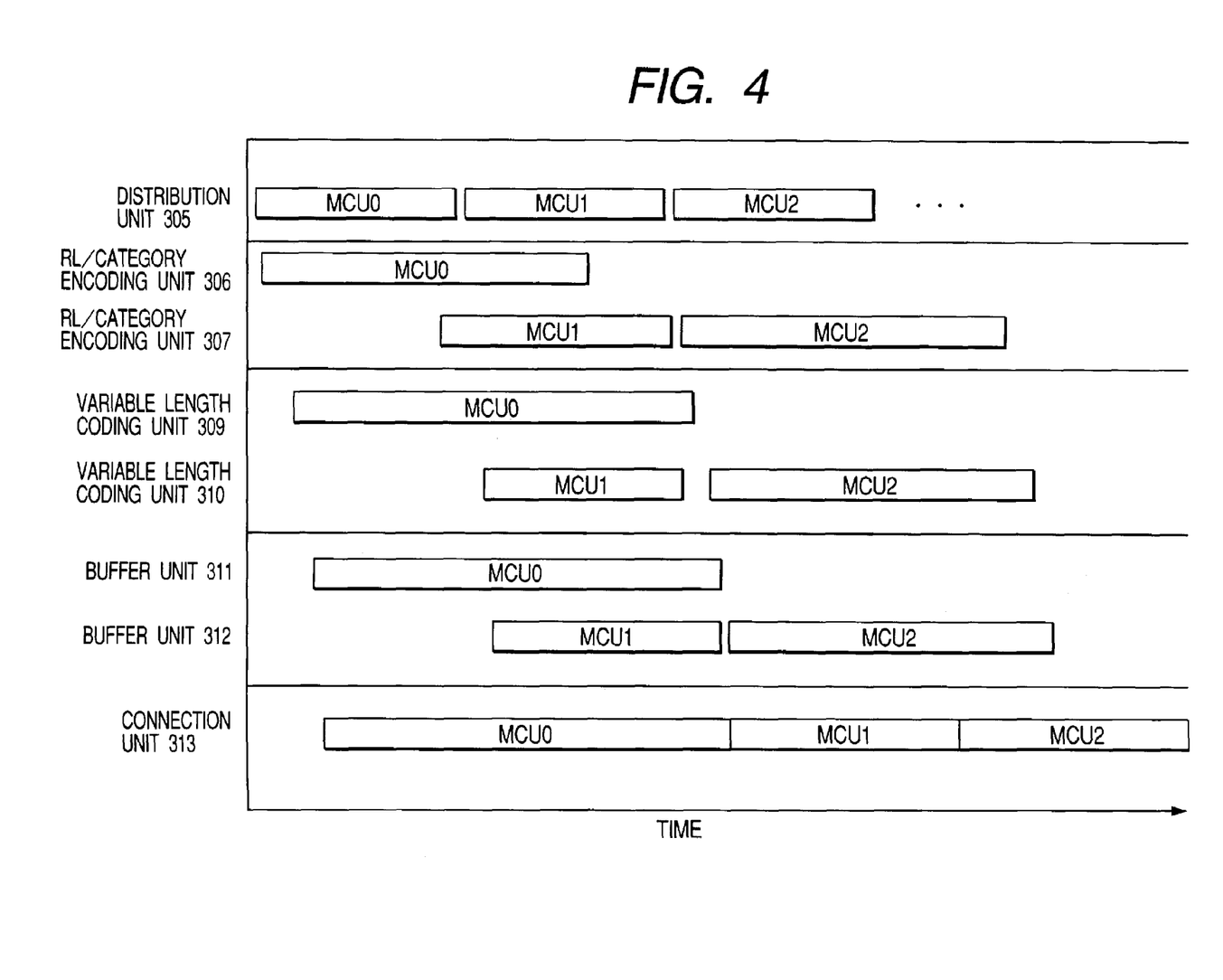
FIG. 4 is a diagram illustrating encoding process times at respective processing units shown in FIG. 3.

FIG. 4 shows the time taken for each unit constituting the entropy coding apparatus to perform each coding process. The abscissa represents a time axis. The length of the abscissa corresponding to the process time of each unit is not necessarily proportional to the code data amount, but the length of the abscissa indicates the time duration while each unit processes each MCU.

First, as an entropy coding unit for processing a stream of quantized orthogonal transformation coefficients (quantized coefficients) corresponding to MCU0 output from QTZ (quantizer) 302, the distribution unit 305 selects a pair of the RL/category encoding unit (1) 306 and variable length coding unit (1) 309.

Next, as an entropy coding unit for processing a stream of quantized orthogonal transformation coefficients (quantized coefficients) corresponding to next output MCU1, the distribution unit 305 selects a pair of the RL/category encoding unit (2) 307 and variable length coding unit (2) 310.

These selection processes correspond to the first process of each entropy coding unit (a process unit constituted of a pair of one RL/category encoding unit and one variable length coding unit), so that a specific prediction control by the distribution prediction unit 308 may not be required.

Namely, selection for each MCU is thereafter performed basically alternately between the RL/category encoding unit (1) 305 and RL/category encoding unit (2) 307, by the distribution unit 305.

However, judgement different from this basis may be made depending upon the process state of each entropy coding unit.

As an example of this, next, the description will be given for the selection of an entropy coding unit for processing a stream of quantized orthogonal transformation coefficients (quantized coefficients) corresponding to next output MCU2.

In this case, the distribution prediction unit 308 predicts and judges, from the number of symbols obtained from the signal line "RL/category encoding results" (1) and the length of the variable length code word obtained from the signal line "variable length coding results (1), that MCU0 has a large code data amount and the throughput will be lowered.

The number of symbols obtained from the signal line "RL/category encoding results" (1) and the length of the variable length code word obtained from the signal line "variable length coding results" (1) represent values for each MCU initialized at the top of each MCU. If prediction judgment by the distribution prediction unit 308 is performed while the RL/category encoding unit (2) 306 executes an MCU process, the number of symbols and the length of the variable length code word represent intermediate result values for the MCU. This is applicable also to the signal line "RL/category encoding results (2).

In accordance with the prediction results, the distribution prediction unit 308 instructs the distribution unit 305 to distribute and supply continuously with MCU1 the stream of quantized orthogonal transformation coefficients (quantized coefficients) of MCU2 to the RL/category encoding unit (2) 307 and variable length coding unit (2) 310.

With such an adaptive selection by the distribution prediction unit 308, a plurality of entropy coding units (a process unit constituted of pairs of one RL/category encoding unit and one variable length coding unit) can be made to efficiently execute a pipeline process in parallel, even if there is a large difference of the code data amount between MCUs.

A method of judging a distribution destination of MCU 2 by the distribution prediction unit 308 of the embodiment is constituted of the following two Steps.

STEP 1

At STEP 1, it is checked whether the RL/category encoding unit is selected according to the basis, which is different from the RL/category encoding unit selected immediately before for MCU.

First, as the basis the distribution unit 305 uses, as the candidate of a distribution destination for MCU 2, the RL/category encoding unit (1) 306 because the RL/category encoding unit (2) 307 was selected as the distribution destination for MCU1 immediately before MCU2. Judgement whether distribution is performed in accordance with the basis can be made by the following addition operation.

$$W1 = S1 + L1 \text{ IF } (W1 > \text{THRESHOLD}),\quad (1)$$

THEN selection according to the basis, ELSE selection different from the basis (2)

Figure 9:
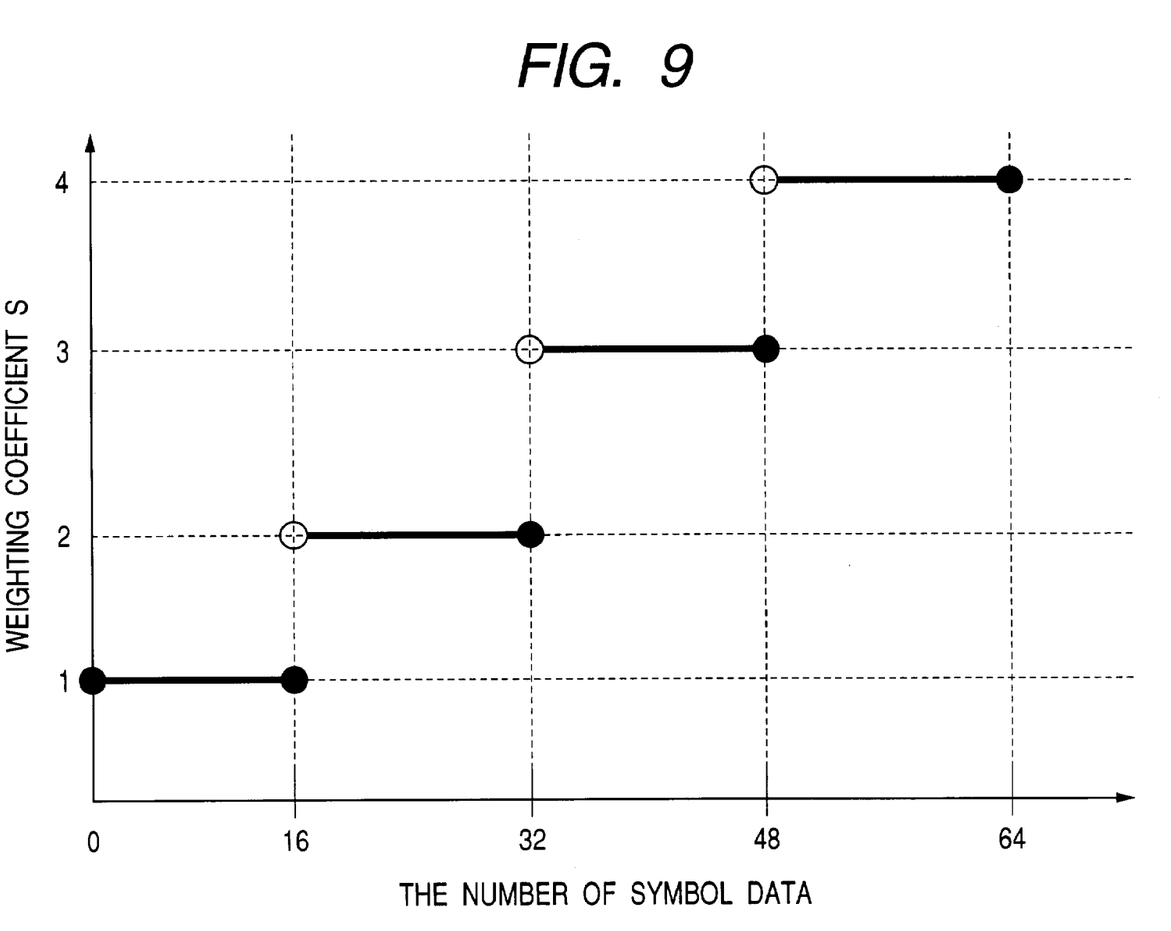
FIG. 9 is a diagram showing the contents of a judgement table for distribution prediction for the number of symbols to be used by a distribution prediction unit 308.
Figure 10:
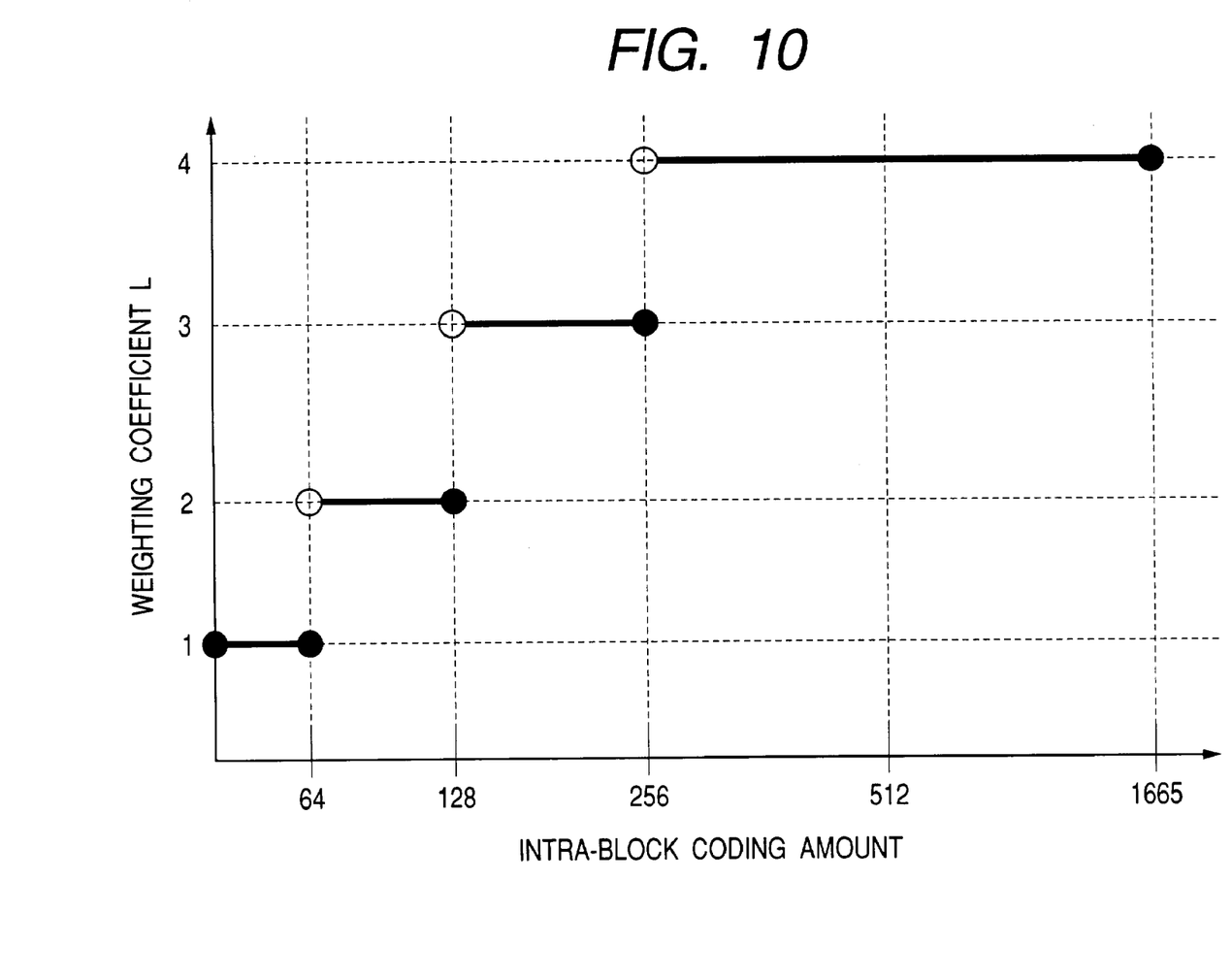
FIG. 10 is a diagram showing the contents of a judgement table for distribution prediction for the length of a variable length code word to be used by a distribution prediction unit 308.

S1 is a value corresponding to a weighting coefficient of the ordinate of a graph shown in FIG. 9 whose abscissa represents the number of symbols supplied to the distribution prediction unit 308 from the signal line "RL/category encoding results" (1). L1 is a value corresponding to a weighting coefficient of the ordinate of a graph shown in FIG. 10 whose abscissa represents the code amount obtained from the signal line "variable length coding results" (1). THRESHOLD is a static constant which is preset before the entropy coding apparatus starts operating. In this embodiment, it is assumed that THRESHOLD=5.

If S1 is 4 and L1 is 3 when the distribution destination for MCU2 is predicted, W1 is 7 so that the judgement different from the basis is necessary. If W1 is equal to or smaller than THRESHOLD, the RL/category encoding unit (1) 306 is selected according to the basis as the distribution destination, without performing a process at STEP 2.

<STEP 2>

At STEP the final judgement is made by considering the encoding state of the RL/category encoding unit different from the basis.

$$W2 = S2 + L2 \text{ IF } (W2 > W1),\quad (3)$$

THEN selection according to the basis, ELSE selection different from the basis (4)

S2 is a value corresponding to the weighting coefficient of the ordinate of the graph shown in FIG. 9 whose abscissa represents the number of symbols supplied to the distribution prediction unit 308 from the signal line "RL/category encoding results" (2). L2 is a value corresponding to the weighting coefficient of the ordinate of the graph shown in FIG. 10 whose abscissa represents the code amount obtained from the signal line "variable length coding results" (2).

If S2 is 2 and L2 is 2 when the distribution destination for MCU2 is predicted, W2 is 4 so that the RL/category encoding unit (2) 307 different from the basis is selected in accordance with the formula (4).

Although only the operation for MCU0 to MCU2 is shown in FIG. 4 for the simplicity of description, the distribution prediction unit 308 performs similar operations for a plurality of succeeding MCUs. Namely, a lower throughput is predicted and judged from the code lengths of the variable code words obtained from the signal lines "RL/category encoding results" (1) and (2), and one of the RL/category encoding units (1) 306 and (2) 307 is selected to distribute MCU.

For example, for a succeeding MCU 3 not shown, the distribution prediction unit 308 predicts the RL/category encoding unit (1) 306 as the distribution destination according to the basis, because the preceding MCU 2 was distributed to the RL/category encoding unit (2) 307 and variable length coding unit (2) 310.

Next, an embodiment applied to the moving image coding system, MPEG1 or MPEG2 system will be described briefly.

Technology used by the entropy coding unit in the MPEG1 or MPEG2 system is very analogous to the JPEG coding system. In the MPEG1 or MPEG2 coding system, the entropy coding unit receives quantized orthogonal transformation coefficients, and the RL/category coding unit generates symbol data in accordance with the number of consecutive 0s and the value following 0s. The two variable length coding units perform the variable length coding of the symbol data by referring to the Huffman table. The embodiment shown in FIG. 3 can be easily applied to the MPEG1 or MPEG2 system by those skilled in the art.

(Dual Mode)

The operation in the dual mode will be described in detail.

In the dual mode, one image is coded by using different coding parameters (compression factors), and a plurality type of variable length coding data (each coding data set has a different code length) representative of one image can be generated.

The dual mode is therefore adequate if the amount of variable length coding data finally generated and output is predetermined from some reason. For example, only one set of a plurality type of variable length coding data sets can be selected at the final stage.

Figure 5:
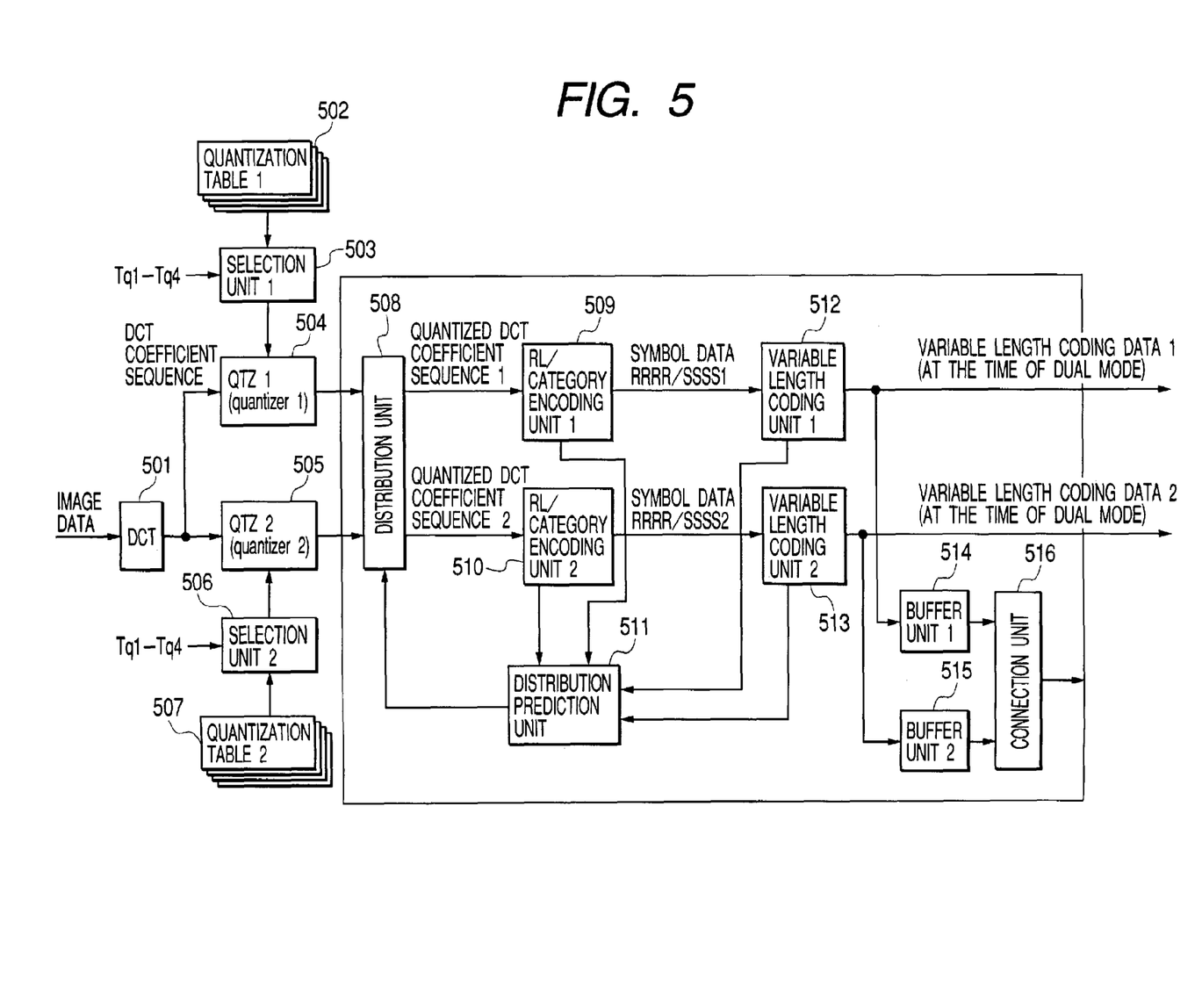
FIG. 5 is a diagram showing an entropy coding apparatus and illustrating the operation in a dual mode.

FIG. 5 is a diagram of the JPEG coding system in the dual mode.

In the dual mode, the entropy coding apparatus generates at the same time two types of JPEG coding data having different bit rates. Also in this coding mode, the distinctive feature resides in that a plurality of runlength (RL)/category encoding units and a plurality N of variable length coding units are used. For the simplicity of description, N=2 is used illustratively.

Although this mode will be described with reference not to FIG. 1 but to FIG. 5, the contents of FIGS. 1 and 5 are substantially the same. Each processing unit shown in FIG. 5 is the same as that shown in FIG. 1 unless otherwise specifically notified. In this coding mode, input image data is subjected to orthogonal transformation well known in JPEG at a DCT unit 501.

Orthogonal transformation coefficients obtained through the orthogonal transformation are quantized by two independent QTZs (quantizers) (1) 502 and (2) 503 by using different coding parameters (quantization parameters).

The same orthogonal transformation coefficients are input to both QTZs (quantizers) (1) 502 and (2) 503.

An entropy coding apparatus similar to that described with the single mode is connected after QTZs.

The DCT unit 501 is quite the same as that used in the single mode.

The function of QTZs (quantizers) (1) 502 and (2) 503 is the same as that of QTZ (quantizer) 302 used in the single mode.

By disposing two units in parallel, it becomes possible to set completely independent two TQ parameters (Tq1 to Tq4) and to set completely independent two types of quantization tables. Tq1 to Tq4 are similar to those described earlier.

As described above, although the same orthogonal transformation coefficient stream is input to QTZs (quantizers) (1) 501 and (2) 503, two types of different JPEG coding data are generated at the same time because different TQ parameters and different quantization tables are used.

The throughput of the input/output interface of each unit of the entropy coding apparatus shown in FIG. 5 is the same as that applied to the single mode.

A considerably different point between the single and dual modes resides in that a distribution prediction unit 511 does not perform distribution prediction in the dual mode. A distribution unit 508 always supplies a stream of quantized coefficients output from QTZ (1) 504 to an RL/category encoding unit (1) 509, and always supplies a stream of quantized coefficients output from QTZ (2) 505 to an RL/category encoding unit (2) 510.

In the dual mode, buffer units (1) 514 and (2) 515 and a connection unit 516 are not used. In the JPEG coding system, two sets of JPEG coding data are output from variable length coding units 512 and 513 to the outside of the entropy coding unit.

Figure 6:
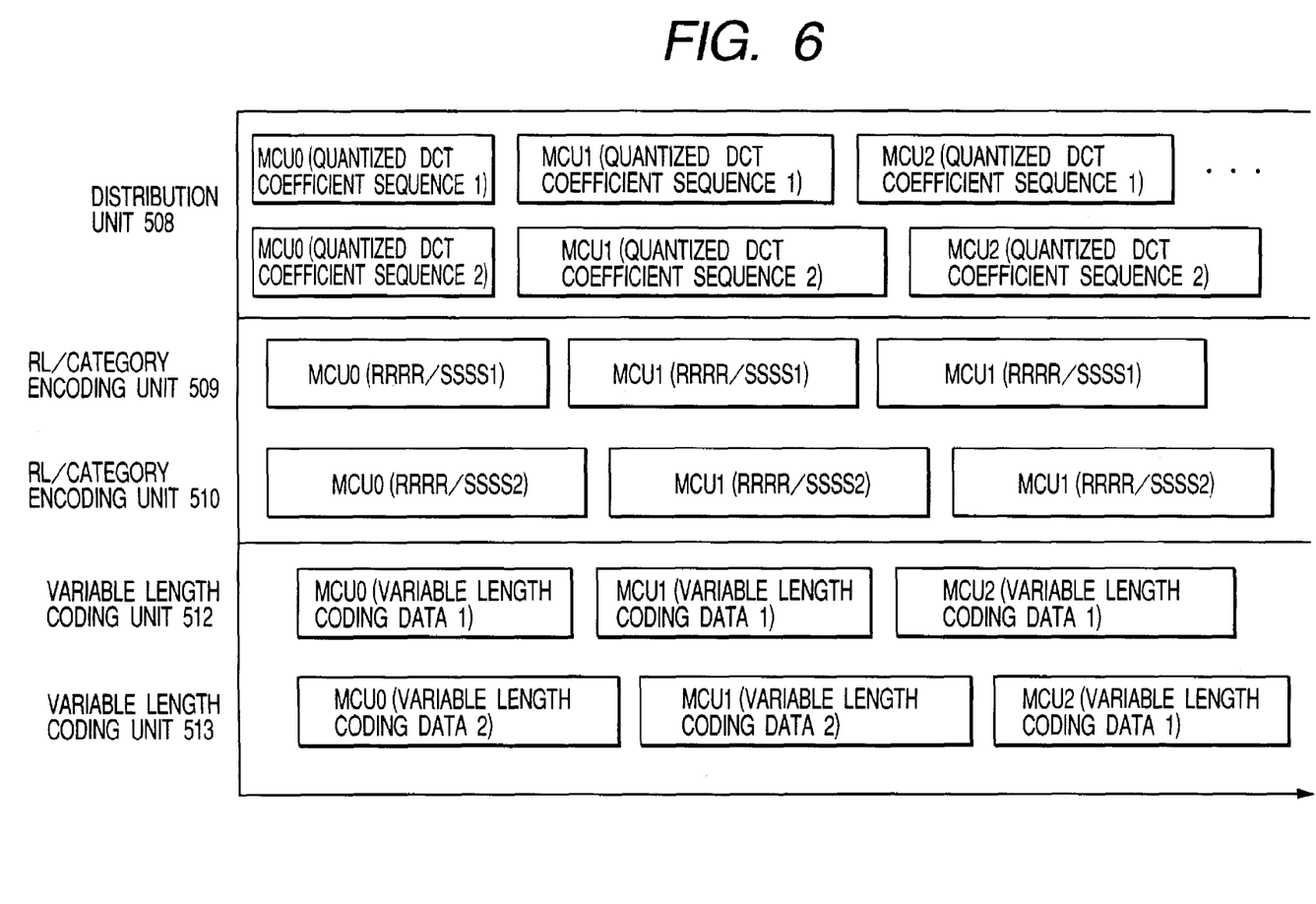
FIG. 6 is a diagram illustrating encoding process times at respective processing units shown in FIG. 4.

FIG. 6 shows the time taken for each unit constituting the entropy coding apparatus to perform a coding process.

The throughput of the entropy coding apparatus in the dual mode is the same as that when two sets of JPEG coding are performed by using conventional technology. By using an entropy coding apparatus capable of performing the single mode, two types of JPEG coding data can be generated at the same time.

In the foregoing description, discrete cosine transformation (orthogonal transformation) known in JPEG is used as a typical example of a method of transforming image data into frequency components. The invention is not limited only thereto. For example, a frequency transformation process such as wavelet transformation used by JPEG2000 may also be used.

As described so far according to the invention, for the entropy coding of image data after subjected to orthogonal transforation and quantization, a plurality of entropy coding units are provided in parallel. The plurality of entropy coding units can be operated efficiently and the entropy coding can be executed at high speed.

For the coding at a high throughput, the load of each process by each of the plurality of entropy coding units is assigned in a well-balanced state so that the entropy coding can be executed at high speed.

In the case that the target amount of variable length coding data to be finally output is set or in other cases, a plurality of variable length coding data sets having different bit rates can be generated at the same time.

Various modifications of the invention are possible without departing from the appended claims.

What is claimed is:

1. An entropy coding apparatus comprising:
   an orthogonal transformation unit for performing an orthogonal transformation of image data;
   a quantization unit for quantizing coefficients obtained by the orthogonal transformation;
   N (natural number of 2 or larger) entropy coding units for entropy-coding the quantized coefficients output from said quantization unit;
   a distribution unit for selecting one of said N entropy coding units for each quantized coefficient and supplying the quantized coefficient to the selected entropy coding unit; and
   a prediction unit for monitoring a coding state of each of said N entropy coding units and predicting an optimum one of said N entropy coding units for a succeeding quantized coefficient as a supplying destination in accordance with monitor results.

2. An entropy coding apparatus for coding image data in a JPEG or MPEG system, comprising:
   N (natural number of 2 or larger) entropy coding units disposed in parallel for entropy-coding a stream of quantized coefficients;
   a distribution unit for selecting one of said N entropy coding units and supplying the stream of quantized coefficients to the selected entropy coding unit;
   a distribution prediction unit for judging an optimum one of said N entropy coding units for a succeeding stream of quantized coefficient as a supplying destination based on entropy coding states of said N entropy coding units; and
   a connection unit for connecting a plurality of variable length coding data sets output from said N entropy coding units.

3. An entropy coding apparatus according to claim 2, wherein:
   the entropy coding apparatus comprises a plurality of quantization units and can perform a first coding mode and a second coding mode;
   in the first coding mode, a coding process is performed by using a single quantization unit, said distribution unit, said distribution prediction unit and said connection unit, and a series of variable length coding data is output;
   in the second coding mode, quantized coefficients output from said plurality of quantization units are supplied to said entropy coding unit predetermined in correspondence to each of said plurality of quantization units, and each of said N entropy coding units outputs generated variable length coding data as separate coding data.

4. An entropy coding apparatus according to claim 2, wherein selection by said distribution is performed for each predetermined pixel block.

5. An entropy coding apparatus according to claim 2, wherein selection by said distribution is performed for each of a set of 8×8 pixels.

6. An entropy coding apparatus according to claim 2, wherein each of said N entropy coding units includes a runlength/category encoding unit and a variable length coding unit.

7. An entropy coding apparatus according to claim 2, wherein the entropy coding state corresponds to the number of symbol data sets in a block as a JPEG compression unit.

8. An entropy coding apparatus according to claim 2, wherein the entropy coding state is a length of variable length coding data in a block as a JPEG compression unit.

9. An entropy coding apparatus according to claim 2, wherein said distribution prediction unit refers to a history of past distribution and supply of said distribution unit, when one of said N entropy coding units is selected.

10. An entropy coding apparatus according to claim 2, wherein said distribution prediction unit adds a specific index number to the start of the stream of quantized coefficients to be distributed and supplied, each time one of two entropy coding units is selected.

11. An entropy coding apparatus according to claim 2, wherein a buffer is connected between each of two entropy coding units and said connection unit, and the buffer temporarily stores the variable length coding data output from each of two entropy coding units and outputs the variable length coding data to said connection unit.

12. An entropy coding apparatus comprising:

a transformation unit for transforming image data into frequency components;

a quantization unit for quantizing coefficients obtained through the transformation;

N (natural number of 2 or larger) entropy coding units for entropy-coding quantized coefficients output from said quantization unit;

a distribution unit for selecting one of said N entropy coding units for each quantized coefficient and supplying the quantized coefficient to the selected entropy coding unit; and a prediction unit for monitoring a coding state of each of said N entropy coding units and predicting an optimum one of said N entropy coding units for a succeeding quantized coefficient as a supplying destination in accordance with monitor results.

* * * * *

UNITED STATES PATENT AND TRADEMARK OFFICE
CERTIFICATE OF CORRECTION

PATENT NO.         : 7,224,844 B2
APPLICATION NO.    : 10/410120
DATED              : May 29, 2007
INVENTOR(S)        : Katsumi Otsuka

It is certified that error appears in the above-identified patent and that said Letters Patent is hereby corrected as shown below:

COLUMN 7

Line 38, "$W1=S1+L1\text{IF}$" should read --$W1=S1+L1$ ¶ IF--; and
Line 63, "$W2=S2+L2\text{IF}$" should read --$W2=S2+L2$ ¶ IF--.

Signed and Sealed this

Seventh Day of October, 2008

JON W. DUDAS
*Director of the United States Patent and Trademark Office*